(12) United States Patent
Yoder et al.

(10) Patent No.: US 9,340,224 B2
(45) Date of Patent: May 17, 2016

(54) MOBILE COOLER WITH SLED OR SKI ATTACHMENT

(71) Applicants: Jason Yoder, Findlay, OH (US); Nancy Neeley, Findlay, OH (US)

(72) Inventors: Jason Yoder, Findlay, OH (US); Nancy Neeley, Findlay, OH (US)

( * ) Notice: Subject to any disclaimer, the term of this patent is extended or adjusted under 35 U.S.C. 154(b) by 0 days.

(21) Appl. No.: 14/492,699

(22) Filed: Sep. 22, 2014

(65) Prior Publication Data

US 2015/0084291 A1  Mar. 26, 2015

Related U.S. Application Data

(60) Provisional application No. 61/880,314, filed on Sep. 20, 2013.

(51) Int. Cl.
| B62B 19/04 | (2006.01) |
| B62B 19/00 | (2006.01) |
| B62B 17/06 | (2006.01) |

(52) U.S. Cl.
CPC .............. *B62B 19/00* (2013.01); *B62B 17/061* (2013.01)

(58) Field of Classification Search
CPC .......... B62B 19/00; B62B 19/02; B62B 19/04
USPC ............... 280/28.17, 28.12, 8, 9, 10, 11, 23.1
See application file for complete search history.

(56) References Cited

U.S. PATENT DOCUMENTS

| 1,581,414 | A | * | 4/1926 | Young .............................. 280/28 |
| 1,900,108 | A | * | 3/1933 | Hedeen et al. ........... 280/87.021 |
| 2,950,924 | A | * | 8/1960 | Gantz .............................. 280/14 |
| 4,163,564 | A | * | 8/1979 | Kramer ........................... 280/10 |
| 4,589,668 | A |   | 5/1986 | Mares |
| 4,842,289 | A | * | 6/1989 | Samuels ........................... 280/8 |
| 5,306,029 | A | * | 4/1994 | Kaiser, II ......................... 280/30 |
| 5,373,708 | A | * | 12/1994 | Dumoulin, Jr. .............. 62/457.7 |
| 5,407,218 | A | * | 4/1995 | Jackson .......................... 280/30 |
| 5,413,361 | A | * | 5/1995 | Mosher ......................... 280/7.12 |
| 5,427,390 | A | * | 6/1995 | Duncan et al. .................... 280/8 |
| 5,620,191 | A | * | 4/1997 | Sayette .............................. 280/13 |
| 5,911,422 | A | * | 6/1999 | Carpenter et al. ................ 280/8 |
| 6,042,122 | A | * | 3/2000 | Mohr ................................. 280/9 |
| 6,152,460 | A |   | 11/2000 | Cooper |
| 6,474,097 | B2 | * | 11/2002 | Treppedi et al. ............. 62/457.7 |
| 6,755,428 | B2 | * | 6/2004 | Butler ........................ 280/47.26 |
| 6,981,705 | B1 | * | 1/2006 | Jolley ........................... 280/7.12 |
| 6,983,941 | B2 | * | 1/2006 | Moscaret et al. ................. 280/8 |
| 7,121,560 | B1 | * | 10/2006 | Balzano .......................... 280/11 |
| 7,143,601 | B1 | * | 12/2006 | Jimenez ...................... 62/457.7 |

(Continued)

*Primary Examiner* — Jeffrey J Restifo
(74) *Attorney, Agent, or Firm* — Global Intellectual Property Agency, LLC

(57) ABSTRACT

Disclosed is a cooler that is adapted for use on various terrain. The cooler includes an insulated body having an inner compartment defined by a bottom wall having side walls extending upwardly therefrom, and a lid hingedly attached at the open upper portion of the body. The body further includes a bottom portion having a pair of rear wheels. In one embodiment, the device includes a sled arrangement. In another embodiment, the device includes a ski arrangement. The ski arrangement includes a pair of skis that may be removably attached to the bottom of the cooler. The sled or ski arrangement of the present invention are preferably attached to the bottom portion of the body, and in front of the rear wheels. In this way, the present invention provides a convenient way to transport a cooler to different locations by preventing the rear wheels from getting stuck on various terrain.

13 Claims, 2 Drawing Sheets

(56) References Cited

U.S. PATENT DOCUMENTS

| | | | |
|---|---|---|---|
| 7,389,608 B1* | 6/2008 | MacKay | 43/57 |
| 7,464,943 B1* | 12/2008 | Poggioli et al. | 280/9 |
| 8,181,811 B1* | 5/2012 | Blake | 220/475 |
| 8,256,156 B1* | 9/2012 | Burgoyne, Jr. | 43/54.1 |
| 8,256,242 B1* | 9/2012 | Evans | 62/457.7 |
| 2004/0061294 A1* | 4/2004 | Flanigan, Jr. | 280/8 |
| 2013/0285337 A1* | 10/2013 | Palagyi | 280/8 |
| 2015/0084291 A1* | 3/2015 | Yoder et al. | 280/8 |

\* cited by examiner

MOBILE COOLER WITH SLED OR SKI ATTACHMENT

CROSS REFERENCE TO RELATED APPLICATION

This application claims the benefit of U.S. Provisional Application No. 61/880,314 filed on Sep. 20, 2013. The above identified patent application is herein incorporated by reference in its entirety to provide continuity of disclosure.

BACKGROUND OF THE INVENTION

1. Field of the Invention

The present invention relates to a mobile cooler. More specifically, the present invention pertains to an improved mobile cooler having a sled or ski arrangement removably attached thereto. The sled and ski arrangements are removably attached near the front of the cooler so that they may be used concurrently with the wheels disposed on the rear of the cooler. The sled and ski arrangements are suitable for use on sand, snow, gravel, or otherwise uneven and rough terrain.

A cooler is an insulated container that is used to keep food or drinks cool. Coolers may be filled with ice to refrigerate the food or drink contained within the cooler. In this way, the coolers help refrigerate food and drinks when there is no electrical power available for running refrigeration appliances or equipment. Thus, coolers are often taken on picnics, and on vacation or holiday.

Traditional coolers typically include a pair of wheels near the back of the cooler body, so that the cooler may be slightly lifted off of the ground at the front and rolled from one location to another. However, it is difficult to maneuver the coolers on sand, snow, gravel, or otherwise uneven and rough terrain. When the cooler is being moved on uneven and rough terrain, the wheels tend to bog down because the wheels do not receive enough traction and get stuck. Alternatively, the wheels can break or become damaged, in which case the user must carry the cooler, which can be extremely difficult and inconvenient.

The present invention is a cooler that is adapted for use on various types of terrain. The device includes an insulated cooler body with a hingedly attached lid, a handle, and a pair of rear wheels. In one embodiment, the device further comprises a sled arrangement that is removably mounted to the bottom of the cooler near the front. The sled is biased towards the top and is slightly tapered near the front end thereof. In this way, the sled arrangement is suitable for pulling the cooler on sandy or snowy terrain. In another embodiment, the device further comprises a ski arrangement that is removably mounted to the bottom of the cooler near the front. The skis are also biased towards the top so that it prevents the wheels from dragging or being stuck. The ski arrangement allows the cooler to be maneuvered on uneven surfaces by allowing the cooler to be tilted from side to side. It is further contemplated that in some embodiments, the sled and ski arrangements may fold into the cooler for storage and pivot outward lock into position for use.

2. Description of the Prior Art

Devices have been disclosed in the prior art that relate to coolers having transporting means. These include devices that have been patented and published in patent application publications, and generally relate to coolers with skis. Some of these devices disclose coolers with a pair of skis that removably attach to the bottom of the cooler. Other devices disclose a pair of skis that secure to the rear wheels of the coolers. These devices, however, do not disclose coolers with skis that may be folded in and out of the cooler. The foregoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,474,097 to Treppedi discloses a mobile cooler having wheels and a convertible sled or ski arrangement. The cooler comprises an insulated cooler body with recessed wheel wells for receiving wheels that are attached with retaining pins. The retaining pins are inserted into mounting holes on the underside of the cooler body. Alternatively, the wheel wells may comprise multiple snap ring or retainer pins for securing the skis or sled to the cooler. While the device of Treppedi discloses a cooler having a convertible sled and ski arrangement, these sled and ski arrangements are mounted onto the wheels rather than to the bottom of the cooler. In contrast, the present invention provides a sled and ski arrangement that may be mounted directly onto the bottom of the cooler near the front. In this way, the present sled and ski arrangement do not interfere with the wheels disposed on the cooler.

U.S. Pat. No. 8,256,156 to Burgoyne discloses a portable cooler comprising two skis removably connected to a bottom-most circumferential edge of two wheels via a pair of spring-loaded clips. In this way, the wheels rest on top of the skis and remain elevated above the ground surface during transportation. Because the wheels remain elevated above the ground, the skis do not allow the wheels to operate, and static friction prevents the skis from sliding easily. In contrast, the present invention comprises a pair of wheels that freely rotate. As the wheels rotate, the wheels reduce the force a user needs to apply to move the cooler. Therefore, the present invention is easier to transport than the device of Burgoyne.

Similarly, U.S. Pat. No. 5,911,422 to Carpenter discloses a wheeled carrier having skis attached to each of the wheels. Each of the skis comprise an opening and a pair of trunnion supports disposed on opposing sides thereof. The skis are mounted so that a top part of the wheel projects above the opening and a bottom part of the wheel projects below the opening. While Carpenter discloses a wheeled carrier having skis, Carpenter fails to disclose a wheeled carrier having a sled. In contrast, the present invention discloses a portable cooler having a sled arrangement that may be mounted to the bottom of the cooler. In this way, the present invention provides versatility to the user.

U.S. Pat. No. 4,589,668 to Mares discloses a wheeled cart with removable skis. The skis are adapted to be mounted under the wheels disposed on the cart. While the device of Mares is suitable for use on a snow covered surface, the design and intent of the Mares device differ from the present invention. The device of Mares is used to transport various items, and is not suitable for keeping food and beverage cool for an extended period of time. In contrast, the present invention comprises a mobile cooler, not a cart. Thus, Mares fails to disclose a mobile cooler having a sled or ski arrangement.

Finally, U.S. Pat. No. 6,152,460 to Cooper discloses a slidable load carrying basket comprising a pair of skis. The skis are permanently affixed to the bottom surface of the basket via fasteners or other suitable means. Thus, the skis are not removably attached. In contrast, the present invention comprises a cooler having a removably attached sled or ski arrangement. As such, the present invention may be configured to be used or stored as desired by the user.

The devices disclosed in the prior art have several known drawbacks. These devices are limited in that the skis or sled are not configured to be used together with the wheels disposed on the cooler. The present invention overcomes these limitations by disclosing sled and ski arrangements that are adapted to be removably attached to the front portion of the cooler. In this way, the sled and ski arrangements are physically independent from the wheels. Additionally, the sled and ski arrangements guide the wheels from the front so that the wheels are prevented from being bogged down. It is therefore submitted that the present invention is substantially divergent in design elements from the prior art, and consequently it is clear that there is a need in the art for an improvement to mobile coolers. In this regard, the instant invention substantially fulfills these needs.

SUMMARY OF THE INVENTION

In view of the foregoing disadvantages inherent in the known types of mobile coolers now present in the prior art, the present invention provides a new and improved mobile cooler wherein the same can be utilized for transporting the cooler on various types of terrain.

It is therefore an object of the invention to provide a new and improved mobile cooler that has all of the advantages of the prior art and none of the disadvantages.

Another object of the present invention is to provide a new and improved mobile cooler that may be transported on various types of terrain, such as snow, sand, gravel, or otherwise uneven and rough terrain.

Yet another object of the present invention is to provide a new and improved mobile cooler having a removably attached sled arrangement.

Still yet another object of the present invention is to provide a new and improved mobile cooler a removably attached ski arrangement.

Still yet another object of the present invention is to provide a new and improved mobile cooler having an insulated cooler body with an inner compartment that keeps food and drinks cool for an extended period of time.

Still yet another object of the present invention is to provide a new and improved mobile cooler that is economic in its construction and durable and efficient as an article of commercial use.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
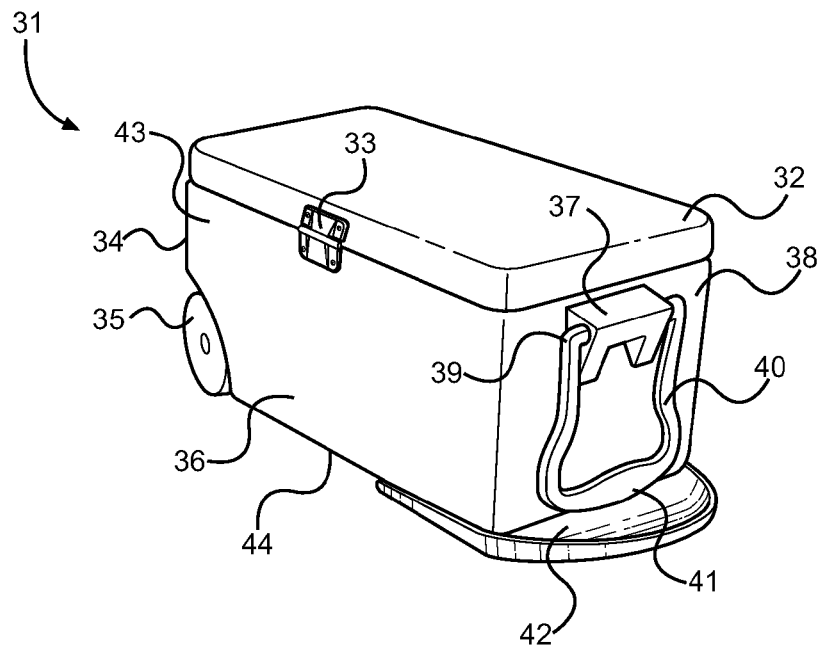
FIG. 1 shows a perspective view of a first embodiment of the present invention.

References are made herein to the attached drawings. Like reference numerals are used throughout the drawings to depict like or similar elements of the mobile cooler. For the purposes of presenting a brief and clear description of the present invention, the preferred embodiment will be discussed as used for transporting the cooler on various types of terrain. The figures are intended for representative purposes only and should not be considered to be limiting in any respect.

Referring now to FIG. 1, there is shown a first embodiment of the present invention. The illustrated embodiment of the present invention comprises a cooler 31 having an insulated body 36 with an open top portion 43, a closed bottom wall 44, a first side wall 38 opposite a second side wall 34, and a third side wall opposite a fourth side wall, defining an inner compartment. The inner compartment may contain divider walls therein to separate portions of the inner compartment. The insulated body 36 is made with interior and exterior shells of plastic, with a hard foam in between.

The open top portion 43 of the insulated body 36 includes a lid 32 attached thereto via a hinge 33 disposed on the third side wall. The lid 32 is substantially rectangular in shape with an upper and lower surface, defining a perimeter with rounded corners. The lid 32 is dimensioned to cover the open top portion 43, thereby blocking access to the inner compartment therein. Similar to the insulated body 36, the lid 32 is also made with interior and exterior shells of plastic, with a hard foam in between. In some embodiments, the lid 32 may further include built-in cup holders on the upper surface thereof.

The rear portion of the insulated body 36 further comprises a first and a second recessed wheel well for holding a pair of wheels 35 therein. The first recessed wheel well may be disposed on the corner formed between the second 34 and third side walls. The second recessed wheel well may be disposed on the corner formed between the second 34 and fourth side walls. Each of the recessed wheel wells may include an aperture thereon for mounting the wheels. The wheels 35 may be rotatably attached to the recessed wheel wells via an axle and retaining pins. The retaining pins are inserted into apertures on the recessed wheel wells. Each of the wheels 35 may be composed of plastic or other suitable materials.

The first side wall 38 includes a handle 40 rotatably attached thereto. The first side wall 38 includes a mounting point 37 having two terminal ends and a hollow interior extending therebetween for receiving the handle 40 therethrough. The hollow interior has a circular cross section with a diameter. The handle 40 is composed of plastic and comprises a first end 39 and a second end 41. The first end 39 is substantially straight and has a circular cross section with a diameter that is less than the diameter of the hollow interior of the mounting point 37 so that the handle 40 can freely rotate therein. The second end 41 of the handle 40 is curved and may be ergonomically shaped so as to provide comfort to the user.

In the illustrated embodiment of the present invention, the bottom wall 44 of the cooler 31 further includes a sled arrangement 42 near the first side wall 38. The sled arrangement 42 comprises a flat board having a flat lower surface that is able to slide on the ground. The sled arrangement 42 is preferably rectangular in shape and of similar width as the cooler 31. The front end of the sled arrangement may be curved. The sled arrangement 42 is composed of durable plastic or other suitable material. The upper surface of the sled arrangement 42 is positioned flush against the bottom wall 44 of the cooler 31 and is removably attached thereto via a set of fasteners. The sled arrangement 42 comprises a front end and a back end, wherein the front end is slightly pointed and angled upward for greater leverage. Additionally, it is preferred that the front end of the sled arrangement 42 extends beyond the first side 38 of the cooler 31 so as to guide the wheels 35 when being transported on snow or sand.

Figure 2:
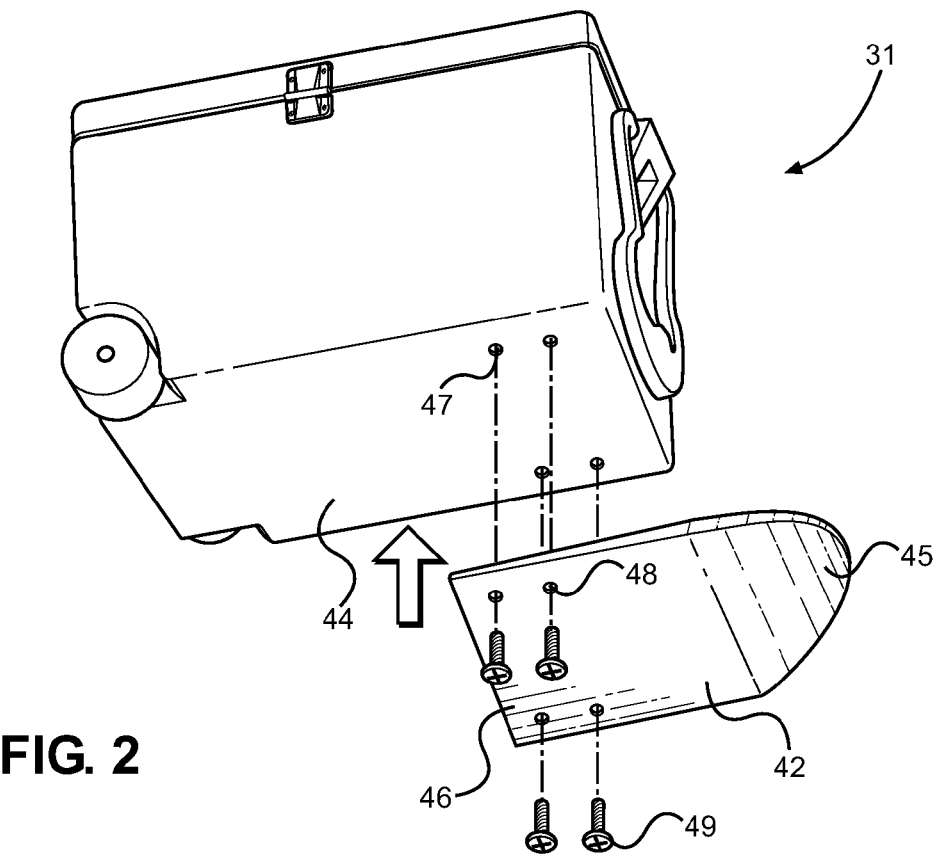
FIG. 2 shows a disassembled view of the first embodiment of the present invention.

Referring now to FIG. 2, there is shown a disassembled view of the first embodiment of the present invention. The first embodiment of the present invention comprises the sled arrangement 42 disposed near the front portion or the first side wall of the cooler 31 on the bottom wall 44 thereof. The sled arrangement 42 comprises a front end 45 and a second end 46. The front end 45 is slightly tapered and biased toward the top. Additionally, the front end 45 extends beyond the front side wall 38 to help guide the cooler 31 when it is transported. The back end 46 is substantially straight and extends toward the middle of the bottom wall 44. It is preferred that the back end 46 does not extend beyond the middle of the bottom wall 44 so that the sled arrangement 42 does not interfere with the functionality of the wheels.

The sled arrangement 42 further comprises a plurality of apertures 48 that extend from the upper surface to the lower surface thereof. The apertures 48 contain threaded element therein such that they are adapted to receive fasteners 49, such as screws, bolts, or other suitable fasteners. When assembled, the upper surface of the sled arrangement 42 is in direct contact with the bottom wall 44 of the cooler 31. Thereafter, the apertures 48 on the sled arrangement 42 are aligned with apertures 47 disposed on the bottom wall 44. The apertures 47 also contain threaded element therein. The fasteners 49 are then inserted through the apertures 47, 48, securing the sled arrangement 42 to the cooler 31.

Figure 3:
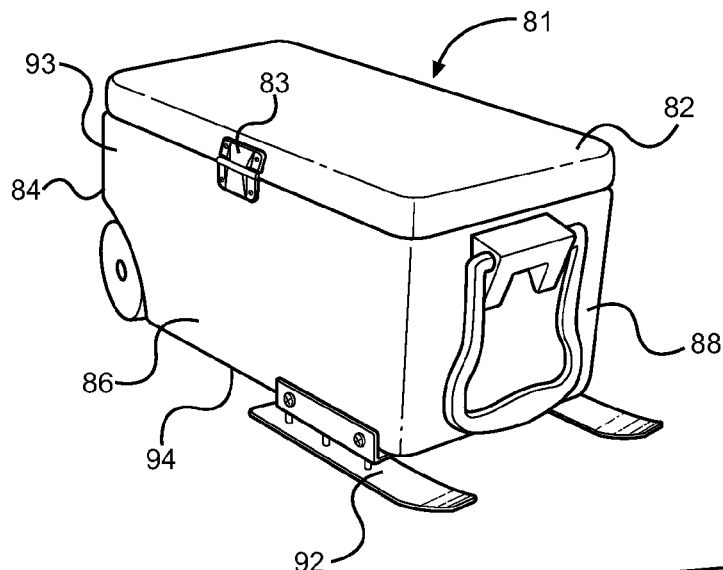
FIG. 3 shows a perspective view of a second embodiment of the present invention.

Referring now to FIG. 3, there is shown a second embodiment of the present invention. Similar to the first embodiment, the second embodiment of the present invention comprises a cooler 81 having an insulated body 86 with an open top portion 93, a closed bottom wall 94, a first side wall 88 opposite a second side wall 84, and a third side wall opposite a fourth side wall, defining an inner compartment. The open top portion 93 of the insulated body 86 includes a lid 82 that is attached via a hinge 83 disposed on the third side wall.

The bottom wall 94 of the cooler 81 further includes a ski arrangement 92 that is composed of durable plastic or other suitable material. The ski arrangement 92 comprises a pair of skis that is attached to the bottom wall 94 via L-shaped supports. The L-shaped supports are constructed to attach to the edges of the cooler 81 along the bottom wall 94 thereof. The ski arrangement 92 is attached to the bottom wall 94 of the cooler 81 via a set of fasteners. The ski arrangement 92 is positioned so that the ski arrangement 92 is parallel to each other and it is parallel to the third and fourth side walls. Additionally, the front end of the ski arrangement 92 extends beyond the first side wall 88, and the back end of the ski arrangement 92 extends toward the middle of the bottom wall 94. Similar to the sled arrangement, the ski arrangement 92 does not extend beyond the middle of the bottom wall 94. In this way, the ski arrangement 92 does not interfere with the functionality of the wheels.

Figure 4:
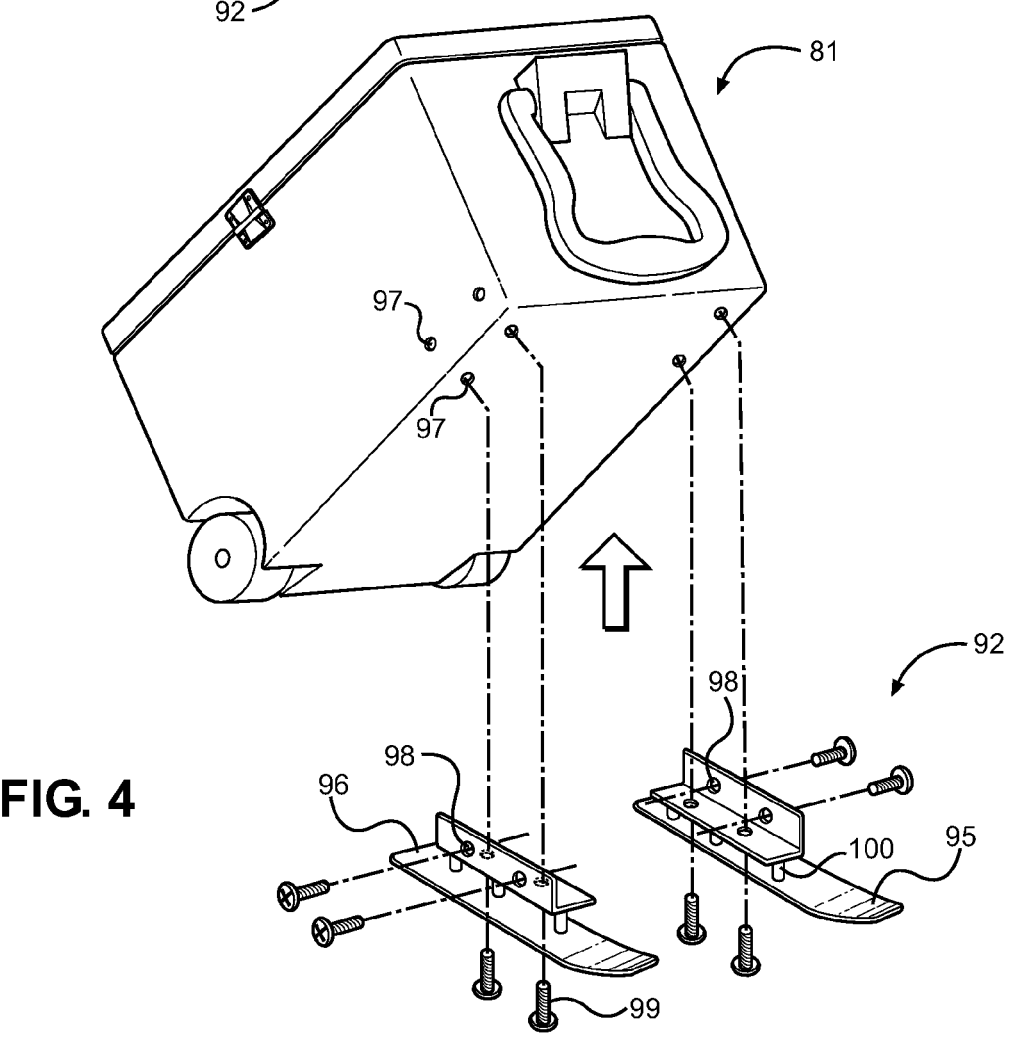
FIG. 4 shows a disassembled view of the second embodiment of the present invention.

Referring now to FIG. 4, there is shown a disassembled view of the second embodiment of the present invention. The ski arrangement 92 comprises a first and a second ski wherein each of the first and second ski comprises a first end 95 and a second end 96, wherein the first end 95 is biased towards the top. Each of the skis also comprise a top surface that is coextensive with a bottom surface. The top surface of each of the skis comprises a plurality of vertical supports 100 having an upper and a lower end. The lower end of the vertical supports is attached to the top surface of the skis, and the upper end of the vertical supports is attached to an L-shaped support. The vertical supports may be attached via strong adhesives or the like. Alternatively, in some embodiments, the vertical supports and the L-shaped support may be unitary in structure.

The L-shaped support includes a first section that is perpendicular to a second section. Each of the first and second sections comprise threaded apertures 98 adapted to receive fasteners 99 therein. When assembled, the first section of the L-shaped support is in direct contact with the third and fourth side walls, and the second section of the L-shaped support is in direct contact with the bottom wall. Thereafter, the apertures 98 on the L-shaped support are aligned with apertures 97 disposed on the cooler 81. The apertures 97 also contain threaded element therein. The fasteners 99 are then inserted through the apertures 97, 98, securing the ski arrangement 92 to the cooler 81.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A mobile cooler for storing and transporting food and beverage items, comprising:
    an insulated body having an open top portion, a closed bottom wall, a first side wall opposite a second side wall, and a third side wall opposite a fourth side wall, defining an inner compartment;
    a lid removably attached to said open top portion;
    a pair of wheels rotatably attached to a back portion of said closed bottom wall;
    a sliding device removably attached to said bottom wall on a front portion of said insulated body;
    L-shaped supports securing the sliding device to the insulated body;
    the L-shaped supports having a first section that is substantially perpendicular to a second section;
    the L-shaped supports being connected to the insulated body.

2. The mobile cooler of claim 1, wherein said back portion of said insulated body further comprises a first recessed wheel well and a second recessed wheel well adapted to receive said pair of wheels.

3. The mobile cooler of claim 1, wherein said first side wall further comprises a handle.

4. The mobile cooler of claim 1, wherein said sliding device is a sled arrangement.

5. The mobile cooler of claim 4, wherein said sled arrangement further comprises a tapered front end that is biased towards said open top portion.

6. The mobile cooler of claim 4, wherein said sled arrangement further comprises a front end that extends beyond said first side wall of said insulated body.

7. The mobile cooler of claim 1, wherein said bottom wall of said insulated body further comprises a plurality of apertures; said plurality of apertures having threaded elements therein.

8. The mobile cooler of claim 7, wherein:
the plurality of the apertures on said bottom wall are aligned with said a plurality of apertures disposed on the second section of the L-shaped support;
the plurality of apertures on the bottom wall and the plurality of apertures on the second section being adapted to receive fasteners therein to secure the second section of the L-shaped support to the bottom wall of the insulated body.

9. The mobile cooler of claim 1, wherein said sliding device is a ski arrangement; said ski arrangement comprising a pair of skis;
wherein said pair of skis are substantially parallel to one another, and extend substantially parallel to said third side wall and said fourth side wall of the insulated body.

10. The mobile cooler of claim 9, wherein a front portion of said ski arrangement is biased towards said open top portion.

11. The mobile cooler of claim 9 wherein said ski arrangement further comprises a front end that extends beyond said first side wall of said insulated body.

12. The mobile cooler of claim 1, further comprising:
a plurality of the apertures on said third side wall and a plurality of apertures of said fourth side wall that are aligned with a plurality of apertures of said first section of said L-shaped supports;
the plurality of apertures on said third side wall and the plurality of apertures of said fourth side wall having threaded elements therein;
the plurality of apertures on said third side wall, the plurality of apertures of said fourth side wall, and the plurality of apertures in the first section of the L-shaped supports being adapted to receive fasteners therein.

13. The mobile cooler of claim 1, further comprising:
a plurality of vertical supports extending from the second section of the L-shaped supports, the vertical supports having an upper end and a lower end;
the lower end of said plurality of vertical supports attached to said upper surface of said sliding device.

* * * * *